United States Patent [19]

Transport

[11] E Re. 30,695

[45] Reissued Aug. 4, 1981

[54] COLLAPSIBLE EASEL SUPPORT

[76] Inventor: Felix Transport, 98 Riverside Dr., New York, N.Y. 10024

[21] Appl. No.: 135,368

[22] Filed: Mar. 31, 1980

Related U.S. Patent Documents

Reissue of:

[64] Patent No.: 4,149,630
Issued: Apr. 17, 1979
Appl. No.: 792,552
Filed: May 2, 1977

[51] Int. Cl.[3] ..... B65D 5/52

[52] U.S. Cl. ..... 206/45.24; 248/465; 40/124.1

[58] Field of Search ..... 40/124.1, 152.1; 206/45.25, 45.24; 248/459, 463, 465, 472

[56] References Cited

U.S. PATENT DOCUMENTS

| | | | |
|---|---|---|---|
| Re. 22,109 | 6/1942 | Hayes | 40/124.1 |
| 1,621,754 | 3/1927 | Rommel | 40/124.1 |
| 2,159,887 | 5/1939 | Darragh | 206/45.25 |
| 2,716,485 | 8/1955 | Hecker | 206/45.25 |
| 3,013,668 | 12/1961 | Mennen | 248/459 |
| 3,035,363 | 5/1962 | Luchsinger | 40/124.1 |
| 3,130,510 | 4/1964 | Nichols | 248/465 X |

*Primary Examiner*—Davis T. Moorhead
*Attorney, Agent, or Firm*—James David Jacobs

[57] ABSTRACT

A collapsible easel support is provided for supporting a display on a surface at an angle. The display has a back panel which has hinged to its bottom edge a stay flap. Two slits extend from the interior of the stay flap to the interior of the back panel. A first score extends between said parallel slits. A second score in the stay flap extends between the two slits. A third score in the back panel extends between the two slits. The first and second scores define a stay panel to fold against said stay flap and said first and third scores define a support panel to support the easel at an angle to the surface.

18 Claims, 29 Drawing Figures

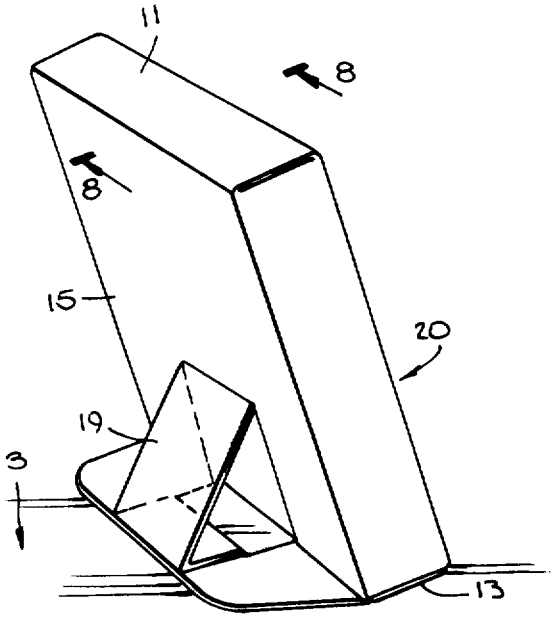
Fig. 7.
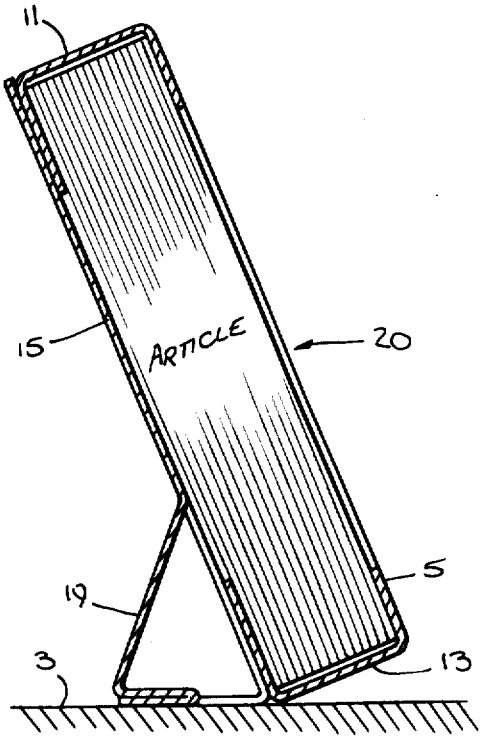
Fig. 8.
Fig. 6.
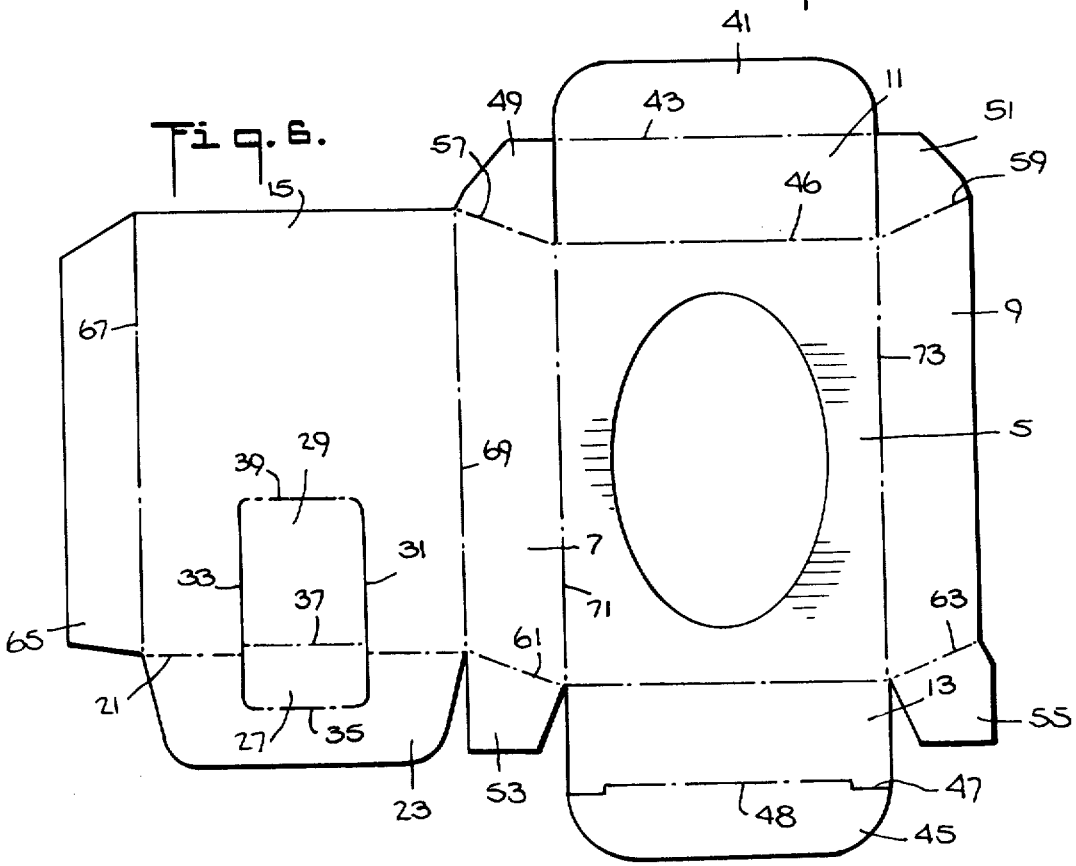

Fig. 10.
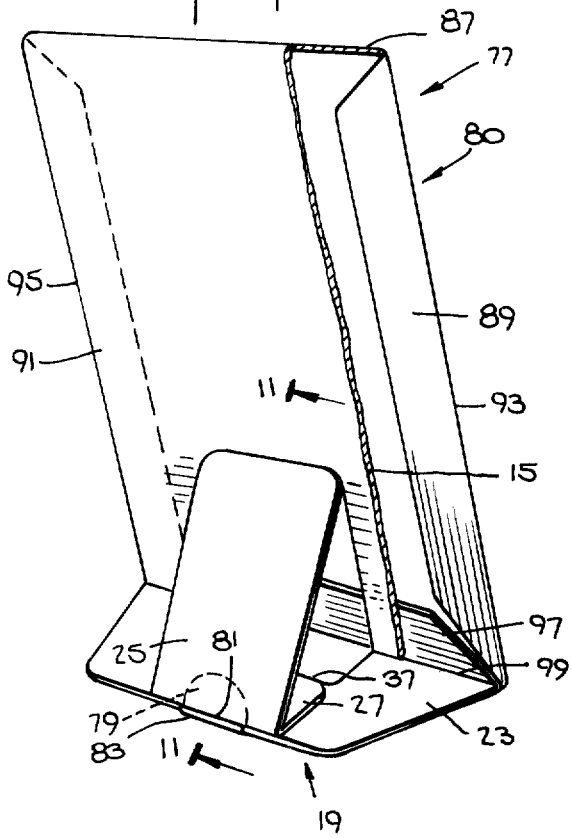
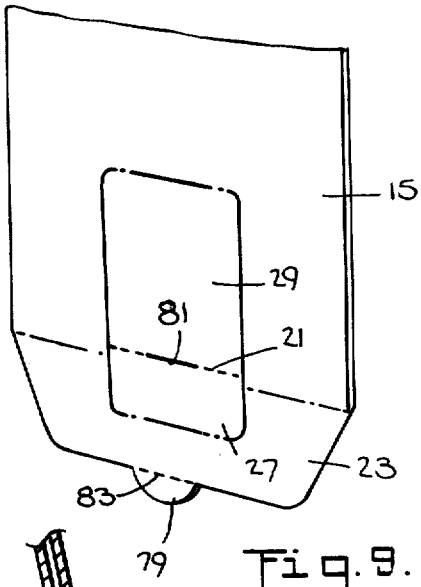
Fig. 9.
Fig. 11.
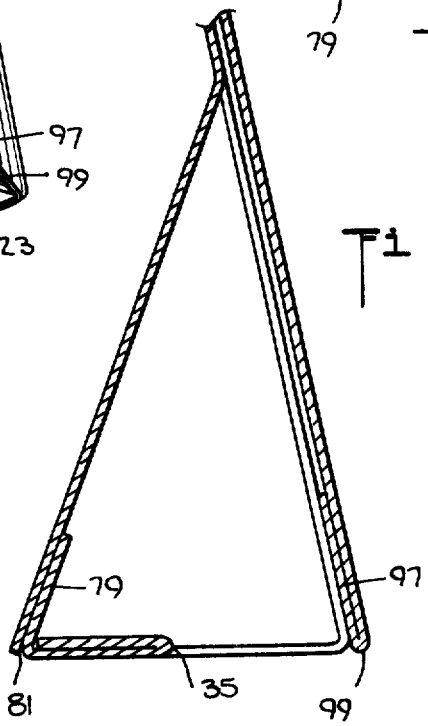
Fig. 12.
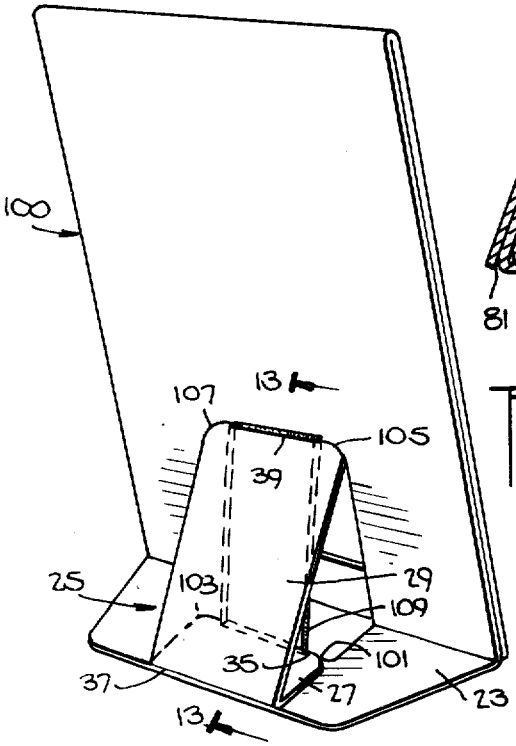
Fig. 13.
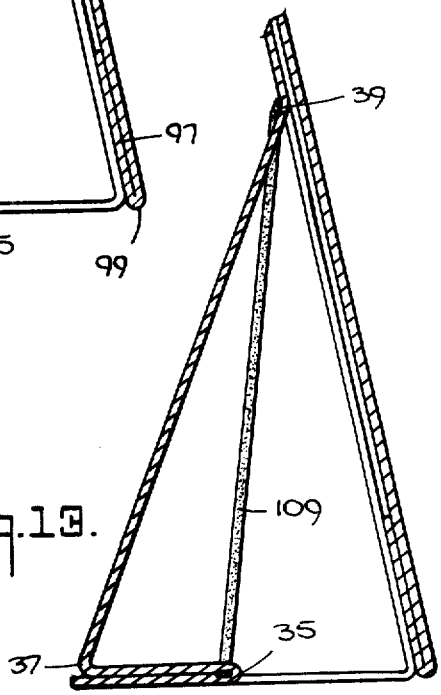

Fig.14.
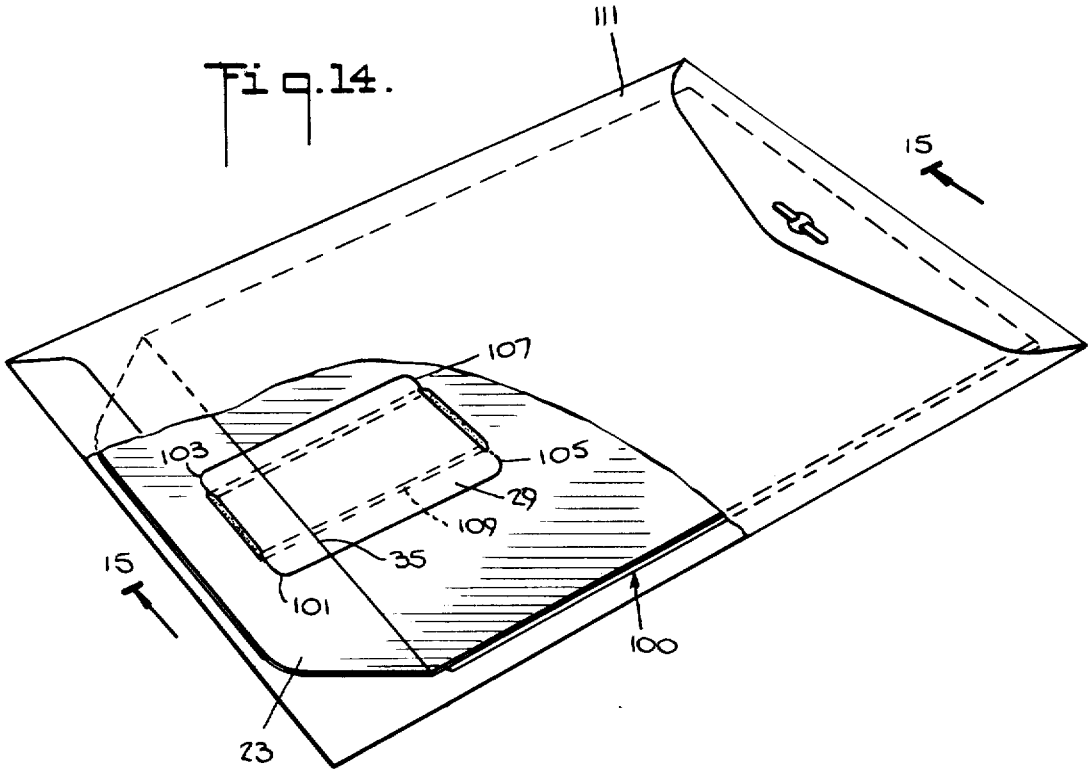
Fig.15.
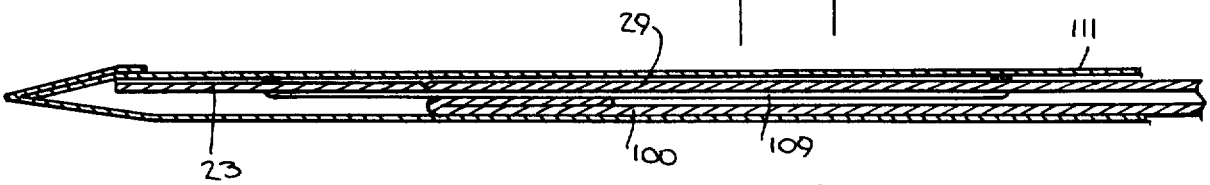
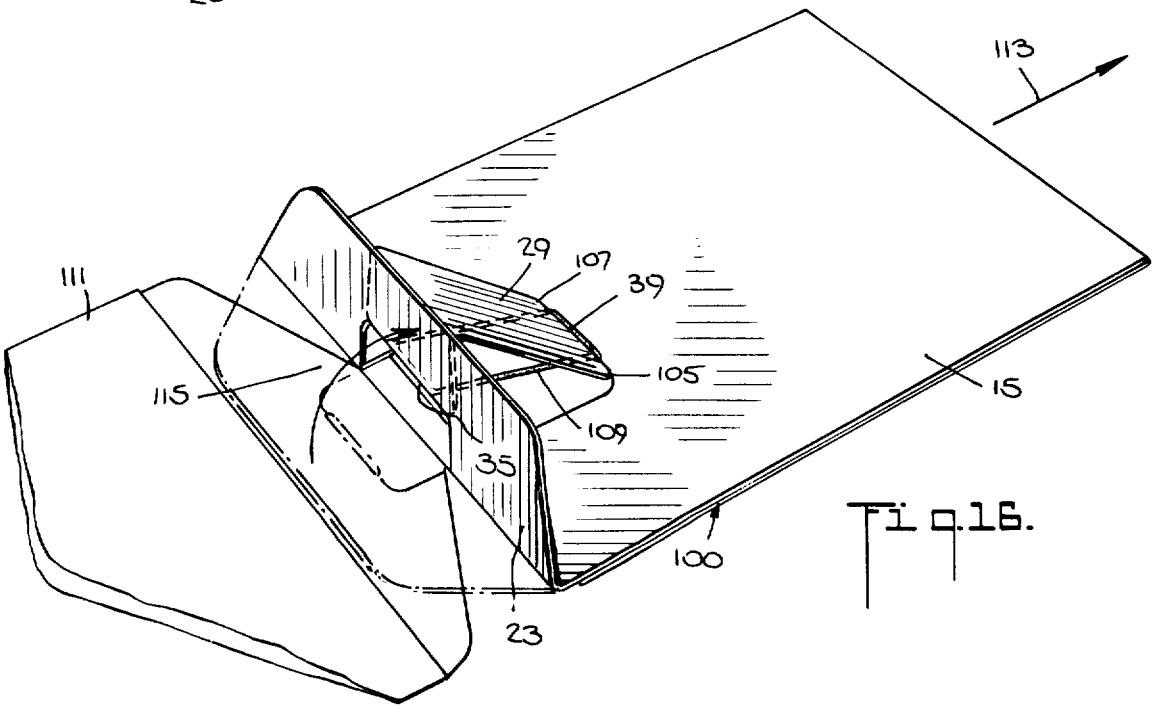
Fig.16.

Fig. 28.
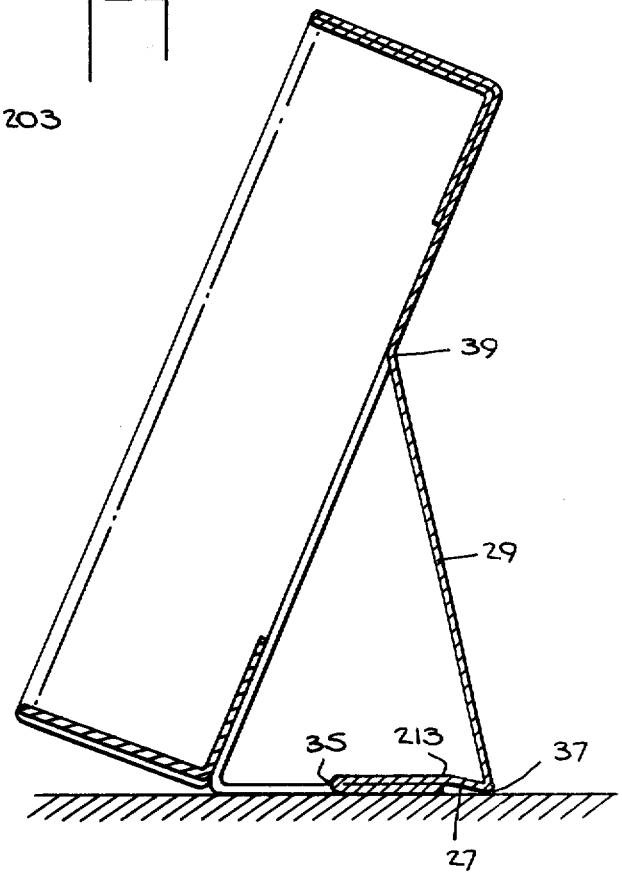
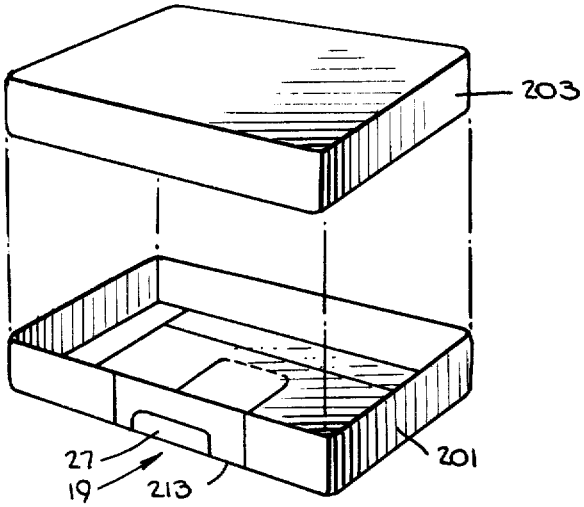
Fig. 25.
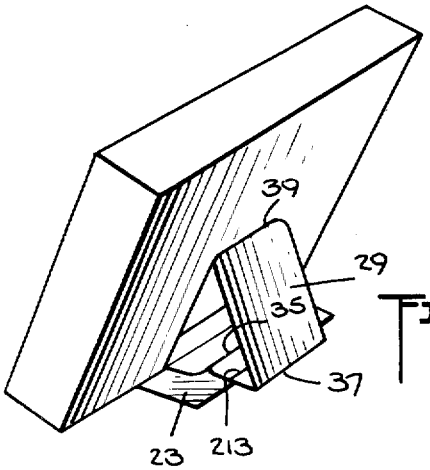
Fig. 27.
Fig. 26.
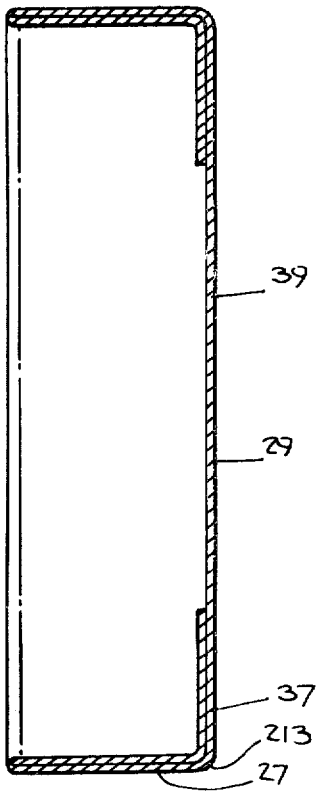
Fig. 29.
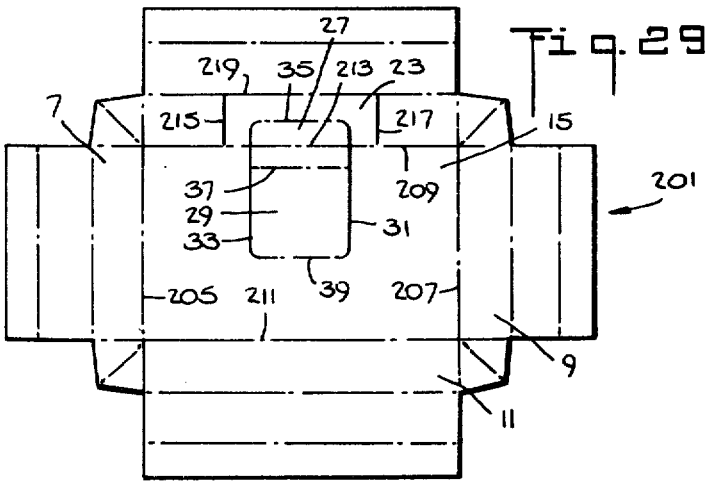

COLLAPSIBLE EASEL SUPPORT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates generally to paper constructions, particularly boxes and cartons, and is more specifically directed to an easel support designed for displaying an article of merchandise or printed matter at a angle to a surface.

2. Prior Art

The prior art discloses a number of easel supports for folding boxes and display cards. The most commonly used form of easel is the wing-type easel. This easel comprises two leg panels foldable into angular position with regard to the display card (or box) to which they are attached.

Wing easels have numerous disadvantages. They are relatively difficult to erect and generally require a stiffer and heavier board than the boards from which the card (or box) is made. For this reason wing easels are generally manufactured separately and are then glued to the back of the display box or panel. In use, wing easels tend to collapse if the box or panel to which they are attached is moved about. Moreover, the legs of the wing easel tend to spread apart under weight, leading to unsteadiness and danger of collapsing.

An improved example of this type of easel support can be seen in U.S. Pat. No. 3,357,671. In this type a display card has a wing easel made from a single blank. The wing easel has one edge of its two hinged panels hinged to the back of the display card. The other edge of the two hinged panels has a locking flap which engages under a slit in the back of display card to form a triangular pyramid between the display card and the two panels of the wing easel. Moreover, this embodiment permits one panel of the two hinged panels to slide into the same slit of the back as the locking flap in order that the wing easel can be collapsed flat against the back of the display card and subsequently deployed by lifting the wing easel where the two panels hinge together.

Unfortunately, because of the wing design this embodiment is quite asymetrical with numerous notches and flaps. As a result layout of this design on paper is is inefficient and creates large waste.

Another type of easel support is disclosed in U.S. Pat. Nos. 2,507,947; 2,783,013; and 1,860,324. In this form the easel is integral with the box and can also be made from a unitary paper blank. The easel is assembled from the flat, collapsed blank to the assembled position without disturbing the assembled box or its contents. In this construction the easel is composed of two panels which are hinged together to form an acute angular support strut. The remaining end of one panel is permanently hinged to the bottom rear edge of the box and the remaining edge of the other panel carries a tongue or tab which engages in a slit in the back of the box to permanently fix that edge in the middle of the box. Thus, the strut creates an easel support between the bottom rear edge of the box and slit in the back of the box.

Unfortunately, this construction results in relatively narrow tongue, which engages in the slit, bearing the weight of the box. An easel support of this design must also be constructed from relatively sturdy board and is susceptible to fatigue failure, particularly at the score or crease between the tongue and the strut panel. Thus, this construction is unnecessarily expensive or susceptiable to failure. Other examples of the prior art can be found in U.S. Pat. Nos. 1,860,324; 1,330,946; 527,694; and British Pat. No. 113,330.

Moreover, all of the described prior art requires manual operation for the deployment of the easel support from a collapsed position. That is, at least one manual operator is necessary to deploy the easel, and often many operations are necessary.

Therefore, it is an object of the present invention to provide an easel support for a display device which can be made from a unitary blank.

It is another object of the present invention to provide for such an easel support for a display device that permits this display device to be closely abutted to each other to make efficient use of the paper from which it is constructed.

It is another object of the present invention to provide for such an easel support which can be quickly and easily assembled.

It is another object of the present invention to provide an easel support which is collapsible and occupies relatively little additional room in a collapsed state than the assembled box for which it provides support.

It is another object of the present invention to provide an easel support which impose substantially weight on tongues or tabs used to lock it in its deployed position.

It is another object of the present invention to provide an easel support which is adaptable to automatic deployment from its collapsed position.

It is another object of the present invention to provide for the above objects in a simple, clean, and relatively inexpensive construction.

SUMMARY OF THE INVENTION

In accordance with the preferred embodiment of the invention, the above and other objects are obtained by a collapsible easel support for supporting a display on a surface at an angle to that surface comprising a back panel having a bottom edge. A stay flap is hinged to said back panel along said bottom edge. Two slits extend from the interior of said stay flap to the interior of said back panel. A first score extends between said two parallel slits. A second score in said stay flap extends between said two slits. A third score in said back panel also extends between said two slits. Said first and second scores define a stay panel to fold against said stay flap and said first and third scores define a support panel to support the easel at said angle to the surface.

DESCRIPTION OF THE DRAWINGS

A more complete appreciation of the invention and many of the attendant features thereof will be readily apparent by reference to the following description when considered in connection with the accompanying drawings.

FIG. 6 is a plan view of a blank for the container of FIG. 1.

FIG. 7 is a perspective view of second container having the easel support of the present invention fully deployed.

FIG. 8 is a side cross-sectional view of the container of FIG. 7.

FIG. 9 is a perspective view of a display card having an easel support according to the present invention with manual locking in collapsed position.

FIG. 10 is a perspective partially cut-away view of the display card of FIG. 9 with the easel support of the present invention fully deployed.

FIG. 11 is a side cross-sectional view of the display card of FIG. 10.

FIG. 12 is a perspective view of a display card having an easel support according to the present invention with automatic deployment and locking in a fully deployed position.

FIG. 13 is a side cross-sectional view of the display card of FIG. 12.

FIG. 14 is a perspective partially cut-away view of the display card of FIG. 12 stored in an envelope in a collapsed position.

FIG. 15 is a side elevational view of the display card of FIG. 14.

FIG. 16 is a perspective view of the display card of FIG. 12 immediately after it is withdrawn from an envelope.

FIG. 25 is a perspective view of a tray and cover having an easel support according to the present invention.

FIG. 26 is a side cross-sectional view of the tray of FIG. 25.

FIG. 27 is a perspective view of the tray of FIG. 25 fully deployed.

FIG. 28 is a side cross-sectional view of the fully deployed tray of FIG. 27.

FIG. 29 is plain view of a blank for the tray of FIG. 25.

Figure 1:
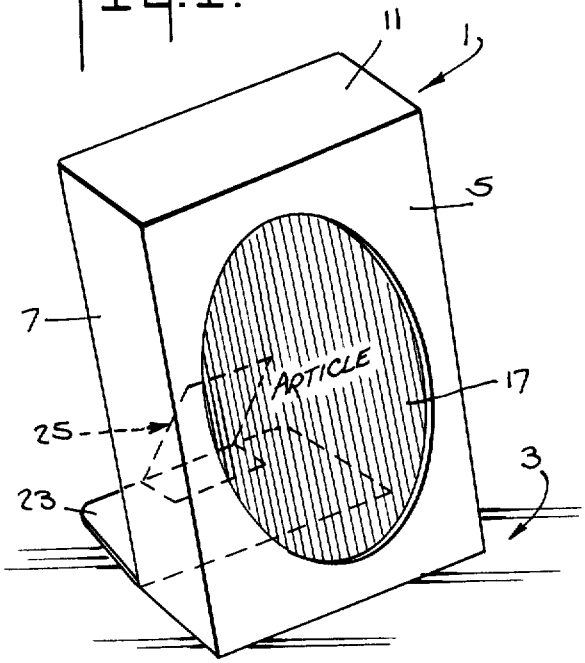
FIG. 1 is a perspective view of a container having an easel support according to the present invention fully deployed.

The present invention will be best understood from consideration of the following detailed description taken in connection with the above described drawings. However, one skilled in the art will recognize that the invention is not defined to the embodiment and variations shown and described.

DESCRIPTION OF THE INVENTION

Referring now to the drawings, wherein like reference characters designate corresponding parts throughout the several views. FIGS. 1 through 6 illustrate one embodiment of the present invention. As used in this embodiment the invention is a merchandising container for displaying a three dimensional article, such as shaving lotion, perfume, cigarette lighter, or the like at an angle to a horizontal display surface. Another feature of the embodiment of FIGS. 1 through 6 is that when displayed in accordance with this invention, the entire bottom surface of the display container is tangential to the display surface, thus providing a pleasing appearance to the consumer.

In FIG. 1, container 1 is shown resting upon display surface 3. Container 1 is an oblique rectangular solid having front panel 5, side panels 7 and 9, top end panel 11, bottom end panel 13, and back panel 15. Front panel 5 has an apperture 17 through which the three dimensional article (not shown) can be viewed in its most appealing form.

Figure 2:
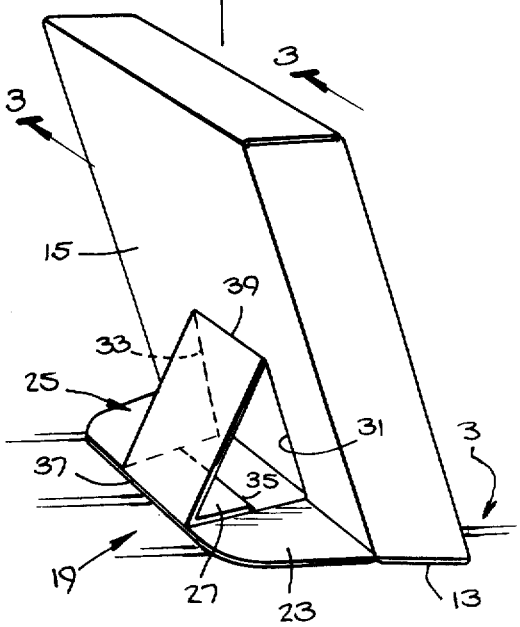
FIG. 2 is another perspective view of the container of FIG. 1.
Figure 4:
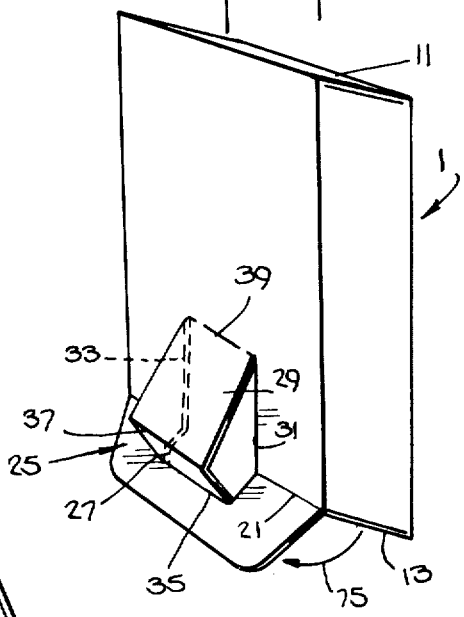
FIG. 4 is a perspective view of the container of FIG. 1 with the easel support of the present invention partially deployed.
Figure 3:
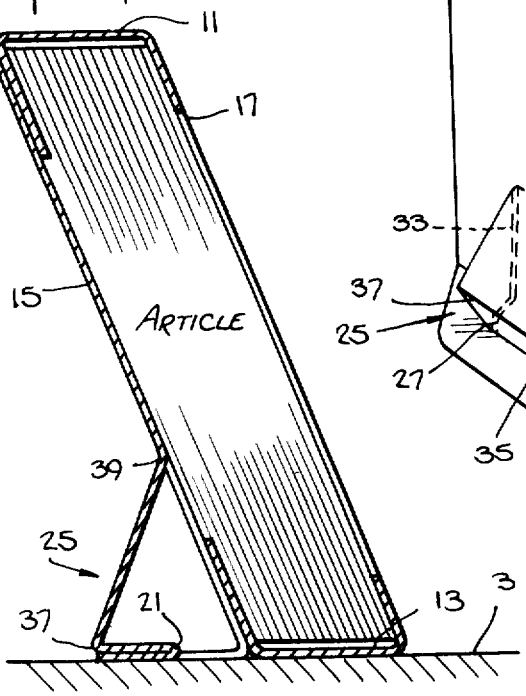
FIG. 3 is a side cross-sectional view of the container of FIG. 1.

Referring to FIGS. 2 through 4, the collapsible easel support 19 of the present invention can clearly be viewed. Stay flap 23 is hinged along score 21 to the bottom edge of back panel 15.

A strut 25 comprises a stay panel 27 and a support panel 29. On either side of strut 25 are parallel slits 31 and 33. Slits 31 and 33 are substantially perpendicular to score 21 and extend on either side of score 21 into back panel 15 and stay flap 23. Stay panel 27 has at its end located in the interior of stay flap 23 score 35 and at its other end score 37. Support panel 29 has at one end score 37 and its other end, located on the interior of back panel 15, score 39.

Scores 35, 37 and 39 are substantially parallel to score 21. Additionally, in the preferred embodiment score 37 is displaced slightly into back panel 15 from a colinear position with score 21 to permit strut 25 to deploy properly, but not so far as to prevent stay flap 23 from folding against bottom end panel 13, as will become evident.

In FIG. 6 there is illustrated the blank from which container 1 is produced. The components already described previously are shown and will not be further identified. Not previously described are top tongue 41, which is hinged to top end panel 11 by score 43. Similarly, bottom tongue 45 is hinged to bottom end panel 13 by score 47. Further, end panels 11 and 13 are hinged to front panel 5 by scores 46 and 48, respectively. Also shown are closure tabs 49 through 55, hinged to their respective side panels 7 or 9 by scores 57 through 63. It should be noted that scores 57 through 63, which form the top and bottom end edges of side panels 7 and 9 are not parallel to scores 46 and 48, but intersect them at the same predetermined angle that easel support 19 supports front panel 5 to support surface 3.

As one skilled in the art will note, container 1 can be effectively laid out on a sheet of paper, with one blank next to another with little unused paper in between.

OPERATION OF FIGS. 1 THROUGH 6

Figure 5:
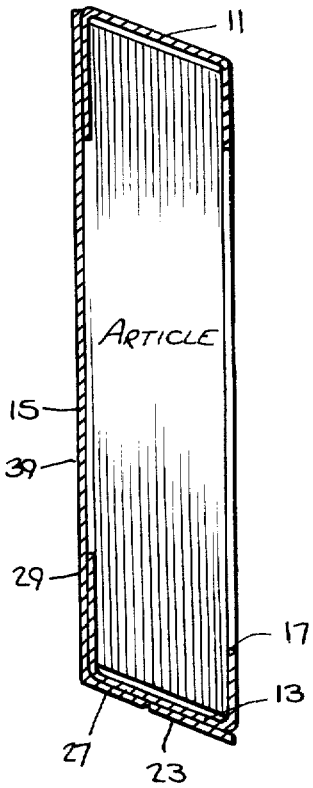
FIG. 5 is a side cross-sectional view of the container of FIG. 1 with the easel support of the present invention undeployed.

As one skilled in the art recognizes, the blank illustrated in FIG. 6 is produced by any one of many well known methods such as die cutting. After formation of the blank and glue is applied to the surface of glue flap 65, the blank is creased along scores 67 through 73 and folded so that flap 65 contacts the obverse face of said panel 9. Then, tongue 45, closure tabs 53 and 55, and bottom end panel 13, are creased along their respective scores and folded to close container 1 at its bottom end. Finally, stay flap 23 is folded along score 21 so as to resemble assembled container 1 as illustrated in FIG. 5, except that top end panel 11 remains parallel to front panel 5 to leave container 1's top end open.

Container 1 is now ready to accept the article which is to be stored and displayed therein. As is recognized to those skilled in the art such an article is usually placed in an inner support so as to properly center the article in aperture 17. The article, and any inner support (which are not shown), are placed into container 1 through the open top end. Subsequently, closure tabs 49 and 51 are folded along their respective scores 57 and 59, and top tongue 41 is folded along score 43 and inserted into container 1 in front of back panel 15.

Container 1 (with the article contained therein) is now prepared for shipping to the retail outlet. Generally, container 1 would be placed with many other container 1's in a shipping carton with easel support 19 in the collapsed position as shown if FIG. 5 (stay flap 23 folded against bottom end panel 13).

When container 1 and its article arrives at the retail outlet, the store clerk will remove container 1 from the shipping carton. He will unfold stay flap 23 from bottom end panel 13 along score 21 in the direction shown by arrow 75 (FIG. 4). Because score 37 is slightly displaced from lower alignment with score 21 stay panel 27 will fold down along score 37 into contact with stay flap 23. Support panel 29 extends from stay flap 23 at score 21 to back panel 15 at score 39.

Thus, when container 1 is placed upon display surface 3, stay panel 27 and support panel 29 form strut 25 with stay flap 23 to support container 1 at a predetermined angle to display surface 3. That is, front face 5 forms an angle greater than 90° to display surface 3, permitting the consumer to more easily view the article in container 1. Furthermore, because scores 57 through 63 form the same predetermined angle with the scores between their respective side panels and front panel or back panel, bottom end panel 13 is flush with display surface 3 and top end panel 11 is paralled to bottom end panel 13.

DESCRIPTION OF FIGS. 7 THROUGH 8

In FIGS. 7 and 8 there is shown another embodiment that permits a display container to rest either on its easel support or on its end. Referring to FIGS. 7 and 8 a rectangular solid container 20 incorporates an easel support 19. The blank for the container of FIGS. 7 and 8 is the same as that shown in FIG. 6, except that scores 57 and 59 and scores 61 and 63 would form a straight line with scores 46 and 48, respectively. Thus, end panels 11 and 13 form a right angle to front and back panels 5 and 15, respectively.

DESCRIPTION OF FIGS. 9 THROUGH 11

In the previously described embodiments no locking for the easel 19 was described. Nor was one needed because the weight of the article in the respective containers was sufficient to lock easel support 19 into its operative position.

However, it is often required to have an easle support an object which would not have sufficient weight to lock the present invention into positive operative position. That is, with a light object, such as a photograph or display card, the resiliency in scores 35, 37 and 39 may cause panels 27 to 29 to return to a co-planar configuration and topple the photograph or display card on its face.

Referring now to FIGS. 9 and 11, where again like reference characters designate parts corresponding to those already discussed, there is shown a display card supported by the present inventory employing a manual lock. More particularly, a display card 77 is provided with easel support 19 comprising a stay panel 27 and a support panel 29 separated by score 37.

Moreover, in this embodiment, the locking tongue 79 is hinged to stay score 37 along score 83. Locking slit 81 is provided along score 37 between stay panel 27 and support panel 29. Slot 81 is so located that, when stay panel 27 is folded against stay flap 23 and locking tongue 79 is folded along score 83, locking tongue 79 can enter locking slit 81 (FIG. 10).

Also clearly shown in FIG. 10 is the construction of display card 77. Display card 77 can be made from a single blank. That is, back panel 15 is separated from front face 85 by score 87. Side flanges 89 and 91 are separated from front face 85 by scores 93 and 95, respectively. Additionally, a bottom flange 97 is separated from front face 85 by score 99. When fully assembled, flanges 89, 91 and 97 provide substantial reinforcement to display card 77 and also provide clean edges to display card 77 for a pleasing appearance to the vendor.

OPERATION OF FIGS. 9, 10 AND 11

Display card 77 is assembled from the blank by applying glue to both sides of flanges 89 and 91. Glue is also applied to both sides of bottom flange 97, but is not applied where support panel 29 bears against bottom flange 97 are folded along scores 93, 95 and 99, respectively, to secure those flanges against the obverse side of front face 85. Back panel 15 is then folded along score 87 to secure the obverse side of back panel 15 against the obverse side of front face 85. Display card 77 then bears the appearance shown in FIG. 9 and is ready for shipment.

After arrival at the display point, the clerk bends stay flap 23 along score 21 to deploy easel support 19 as shown in FIG. 10. Then, the clerk bends locking tongue 79 along score 83 and inserts locking tongue 79 in locking slit 81. Easel support 19 is now secured into its fully deployed position with stay panel 27 firmly locked into contact with stay flap 23. Note, however, that locking tongue 79 does not bear the weight of display card 77.

DESCRIPTION OF FIGS. 12 THROUGH 16

Shown in FIGS. 12 through 16 is a display card 100 according to the present invention with an automatic lock. Again, elements of FIGS. 12 through 16 which are similar to those of previous embodiments bear like reference characters.

Like the previous embodiments, display card 100 comprises a strut 25 having a stay panel 27 and a support panel 29. Also like the other embodiments, its deployed position stay panel 27 bears against stay flap 23 and back panel 15 is supported at the predetermined angle to surface 3 by support panel 29.

Also clearly shown in FIGS. 12 through 16 are channels 101 through 107. Channels 101 and 103 start at slits 31 and 33, respectively, and run a short distance along score 35 towards the interior of stay panel 27. Similarly, short channels 105 and 107 emanate from slits 31 and 33, respectively, and run along score 39 a short distance towards the interior of support panel 29.

Bias means are provided by continuous elastic cord 109, which extends from the interior end of short channel 101 to the interior end of short channel 105, along score 39 to the interior end of short channel 107. From there it extends to the interior end of short channel 103 and back along score 35 to the interior end of short channel 101. Elastic cord 109 can be an ordinary rubberband of suitable elasticity.

In other respects the display card 100 is similar to display card 77 shown in FIGS. 9 through 11, except for the absence of locking tongue 79 and locking slit 81. Reference should be made to the above description of display card 77 for a further understanding of the construction of the display card 100.

OPERATION OF FIGS. 12 THROUGH 16

FIGS. 14 through 16 illustrate the use of the automatic lock embodiment. In FIG. 14 display card 100 having an automatic lock is shown stored in an evelope 111. As one skilled in the art will recognize, easel support 19 in its collapsed position is co-planar with back panel 15.

The recipient opens envelope 111 and removes automatic display card 100. When the bottom edge of stay flap 23 emerges from the envelope, elastic cord 109 biases score 35 towards score 39, causing score 37 between stay panel 27 and support panel 29 to bow away from back panel 15. Thus, as shown by arrow 115, stay flap 23 is moved from its collapsed co-planar position with back panel 15 to a deployed angular position to back panel 15. In sum, as automatic display card 100 is removed from envelope 111, stay flap 23 is automatically moved and locked into its deployed position against strut 25.

DESCRIPTION OF FIGS. 17 THROUGH 20

FIGS. 17 through 20 illustrate another automatic lock embodiment. In this embodiment, a display card 121 includes holding means 123. Other than for the holding means 123 as described below, easel support 19 and other features of display card 121 are similar to previously described embodiments and will not be further described.

Figure 18:
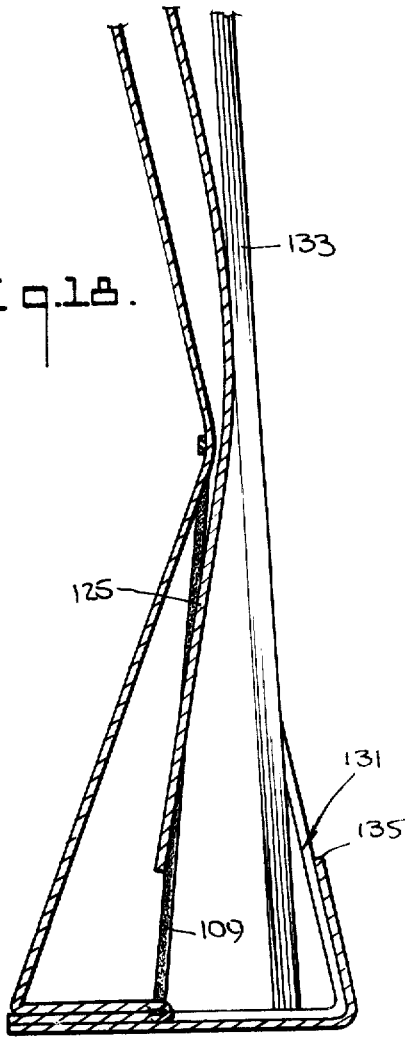
FIG. 18 is a side cross-sectional view of the display card of FIG. 17.

Holding means 123 is a pocket 131 comprising a pocket flap 125 cut from front panel 5 to define an aperture 127. At its upper end, pocket flap 125 is hinged to front panel 5 at score 129. When pocket flap 125 is hinged out of front panel 5 rearwardly, pocket 131 is formed which can receive handout cards 133 (FIG. 18). Aperture 127, and thus pocket flap 125, has a bottom edge 135. At its outward ends, bottom edge 135 has upwardly and inwardly inclining edges 137 and 139, which define tabs 141 and 143 on pocket flap 125. Tabs 141 and 143 engage elastic cord 109 as is evident below.

Aperture 127 also has extending from the inwardmost extension of inclining edges 137 and 139 substantially parallel vertical side edges 145 and 147. In this embodiment, vertical side edges 145 and 147 extend approximately one-third the height of aperture 127. The distance between vertical side edges 145 and 147 is slightly less than the distance between the vertical portions of elastic cord 109 so as to permit pocket flap 125 to pass between said vertical portions of elastic cord 109.

At the upwardmost extension of vertical edges 145 and 147 are outwardly extending horizontal edges 149 and 151. The distance between the farthest extension of horizontal edges 149 and 151 is slightly greater than the width of handout cards 133 that are to be placed in pocket 131. From the outwardmost extension of horizontal edges 149 and 151 there extends upwardly to score 129 vertical side edges 153 and 155.

OPERATION OF FIGS. 17 THROUGH 20

Figure 19:
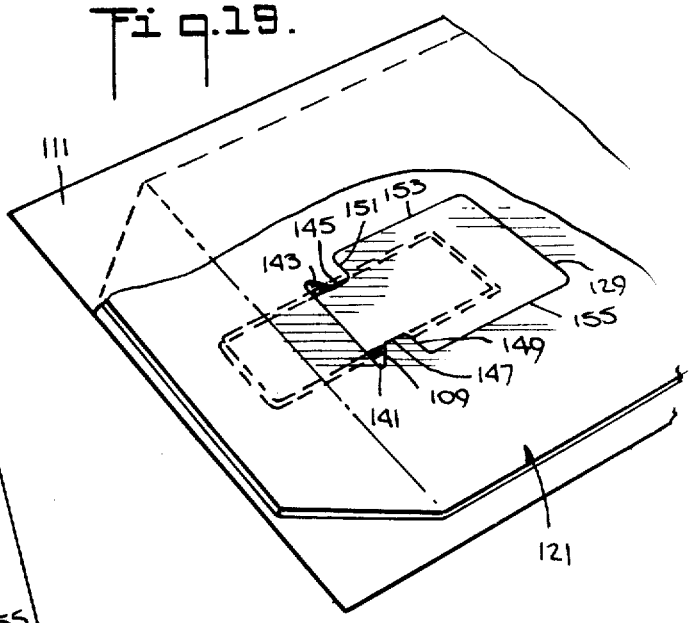
FIG. 19 is a perspective, partially-cut-away view of the display card of FIG. 17 stored in an envelope in a collapsed position.

FIG. 19 shows display card 121 stored in envelope 111. Of particular importance during storage is that elastic loop 109 extends around and engages the front face of tabs 141 and 143 to bias them toward support panel 29.

The receipient opens envelope 111 and removes display card 121. When the bottom edge of stay flap 123 emerges from envelope 111, elastic cord 109 biases score 35 towards score 39, causing 37 between stay panel 27 and support panel 29 to bow away from back panel 15 to deploy strut 25. Simultaneously, elastic cord 109 biases flap 125 by means of tabs 141 and 143 out of front panel 5 toward support panel 29, creating pocket 131.

Figure 17:
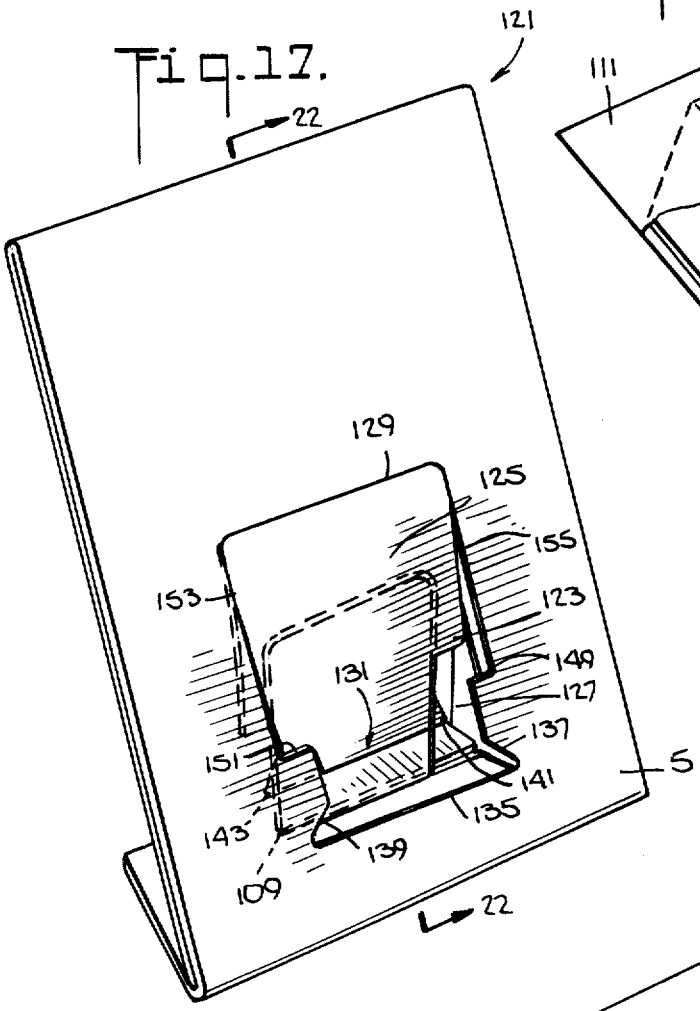
FIG. 17 is a perspective view of a display card having an easel support and a holding means for handout cards according to the present invention.
Figure 20:
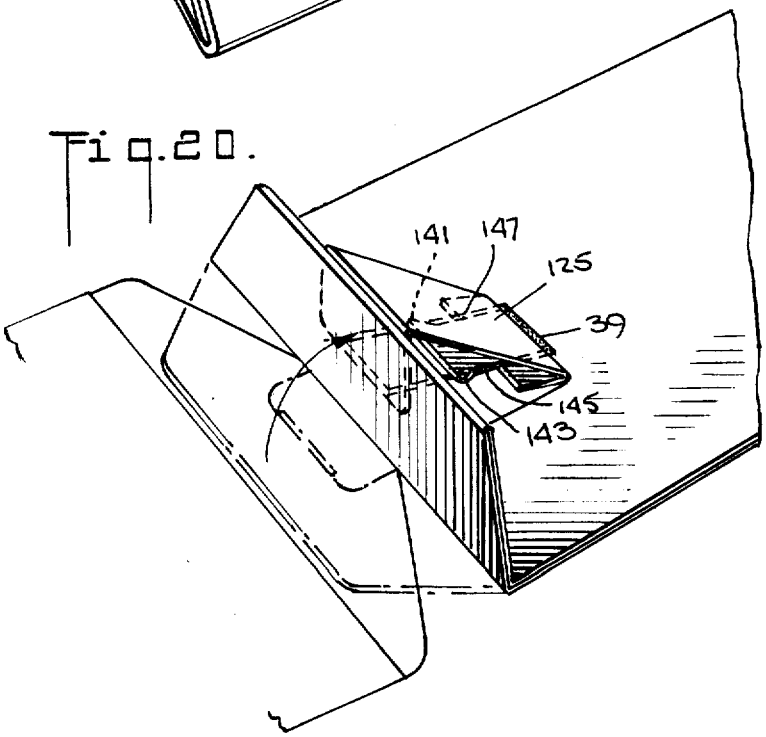
FIG. 20 is a perspective view of the display card of FIG. 17 immediately after it is withdrawn from an envelope.

Thus, as shown in FIG. 20, stay flap 23 is moved from its collapsed coplanar position with back panel 15, and flap 125 is moved from its coplanar position with front panel 5 to the fully deployed position shown in FIG. 17.

DESCRIPTION OF FIGS. 21 THROUGH 24

Figure 21:
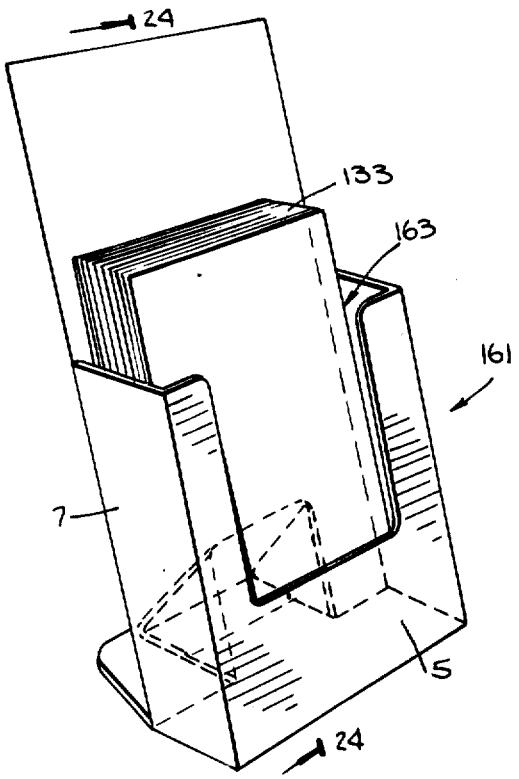
FIG. 21 is a perspective view of a container for handout cards having an easel support according to the present invention fully deployed.
Figure 22:
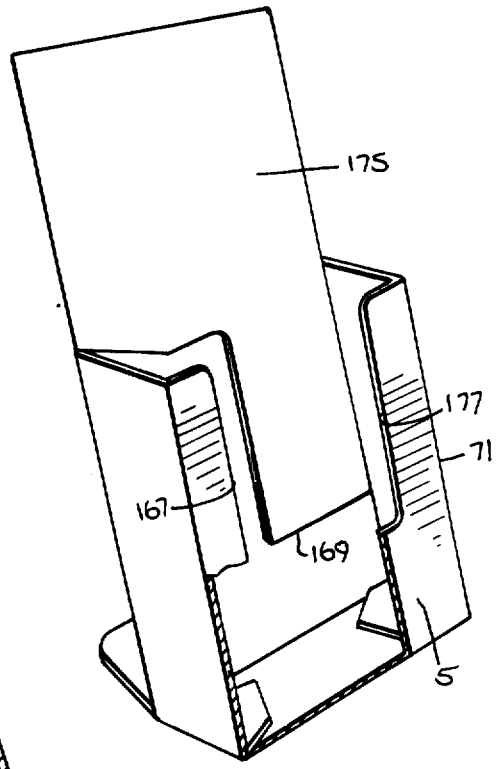
FIG. 22 is a partially cut-away perspective view of the container of FIG. 21.

Illustrated in FIGS. 21 through 24 is a handout card display container 161. As in the foregoing embodiments, display container 161 includes an easel support 19. The particular embodiment of container 161 is similar in some respects to the construction to container 1 of FIGS. 1 through 6. However, as best seen in FIGS. 21 and 22, a portion of front panel 5 and side panels 7 and 9 have been cut away to form a pocket 163. However, as described below, rather than just cutting a portion of container 161 away and discarding it, as herein after described it is retained to provide a display or print surface and add structural strength.

Figure 23:
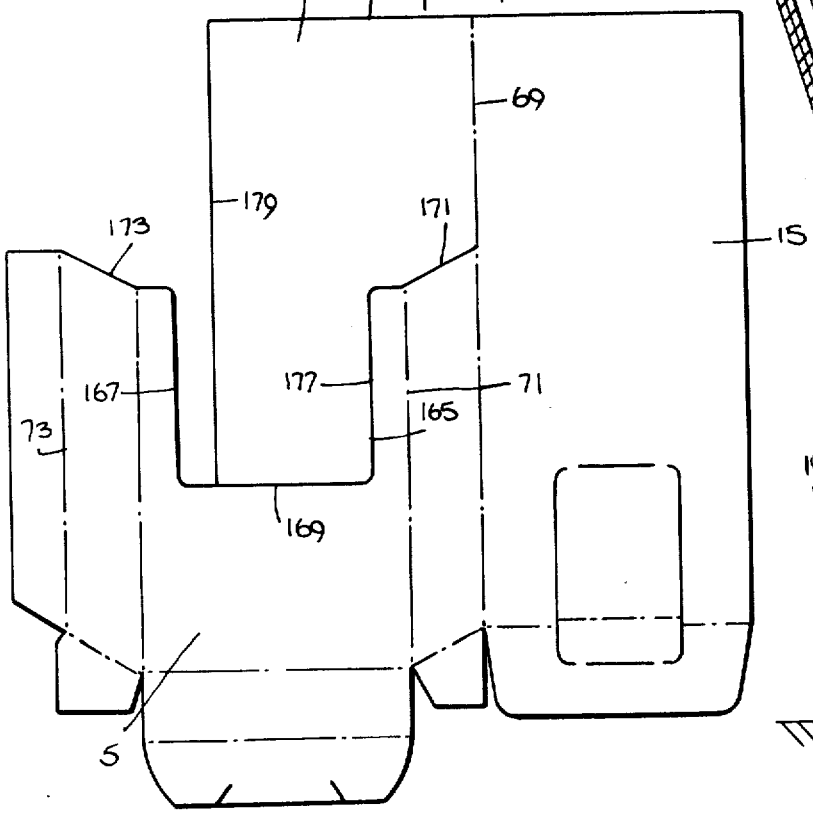
FIG. 23 is a plan view of a blank for the container of FIG. 21.

Referring to FIG. 23, the blank of display container 161 can be viewed. Comparison of the blank shown in FIG. 23 to the blank shown in FIG. 6 reveals numerous similarities which are shown by like reference characters in the two figures. (One skilled in the art will recognize that these respective blanks are partial mirror images of one another—another illustration of the possible variations applicable to the present invention.) However, display container 161 incorporates on front panel 5 a notch defined by vertical side edges 165 and 167 and bottom edge 169. Side edges 165 and 167 extend approximately one-half the height of front panel 5. Substantially horizontal broken edges 171 and 173 extend from side edges 165 and 167, respectively, to scores 69 and 73.

Score 71 between front panel 5 and side panel 7 extends from the bottom end edge of panel 5 to broken edge 171. A print flap 175 is hinged to back panel 5 by score 69, and is defined at its lower extremities by broken edge 171 and bottom edge 169. Connecting the innermost extension of broken edge 171 and bottom edge 169 is vertical side edge 177. Print flap 175 also has a side edge 179 substantially parallel to score 69 extending from bottom edge 169 to top edge 46 (formerly score 46 in display container 1). As best shown in FIG. 22, print flap 175 folds along score 69 to lie against the obverse face of back panel 15.

OPERATION OF FIGS. 21 THROUGH 24

Display container 161 is folded and glued in accordance with display container 1 of FIGS.1 through 6. Additionally, as shown in FIG. 22, glue is applied to both faces of glue flap 65 and glue flap 65 is laid against the obverse face of back panel 15. Then print flap 175 also is laid against the obverse face of back panel 15 to sandwich glue flap 65 between print flap 175 and back panel 15.

Figure 24:
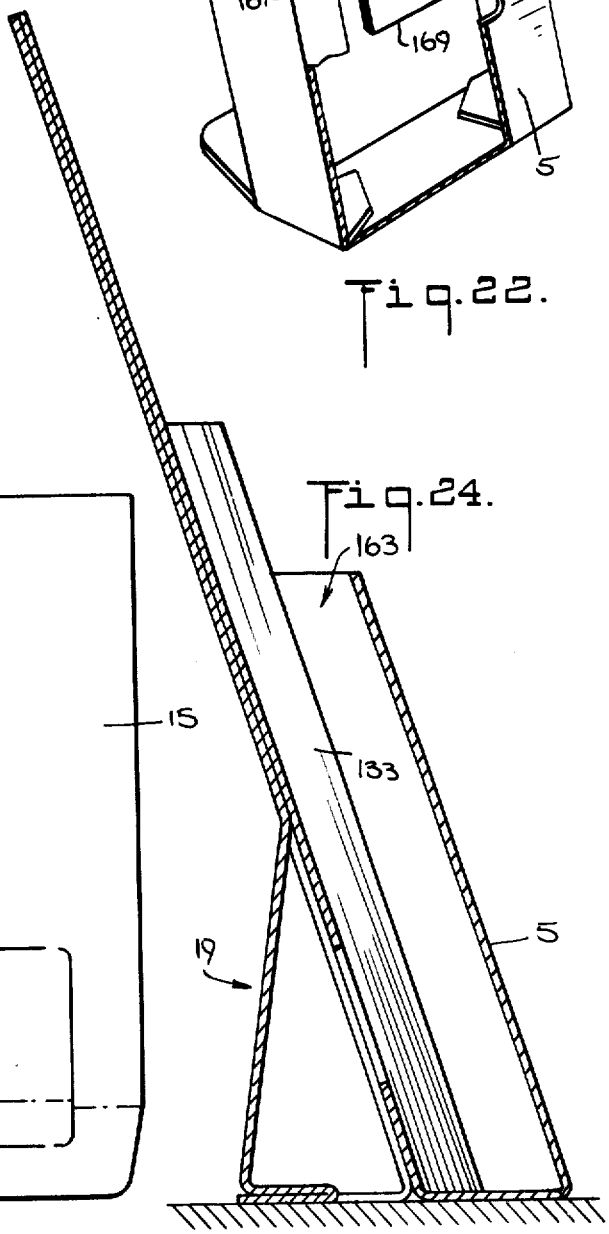
FIG. 24 is a side cross-sectional view of the container of FIG. 21.

When so folded a pocket 163 is formed into which handout cards 133 can be inserted (FIG. 24).

This construction has numerous advantages. It reinforces back panel 15 and better secures glue flap 65 into a fixed position. It also covers the unfinished obverse side of back panel 15 with the good side of the material from which display container 161 is constructed. Thus, the material from which display box 161 is constructed can be printed on one side only, yet exhibit to the viewer a finished printed surface, even on the visible interior of pocket 163 above handout cards 133. This creates a display card surface, upon which advertising matter can be printed.

DESCRIPTION OF FIGS. 25 THROUGH 29

Illustrated in FIGS. 25 through 29 is a tray 201 and cover 203 embodying an easle support 19 according to the present invention. Particularly noteworthy is that tray 201 utilizes no additional material or requires no additional manufacturing steps than are required by the standard tray presently used to package consumer items such as toiletries and confectionaries. Nevertheless, according to the present invention tray 201 embodies a self-contained collapsible easle support 19.

More particularly, referring to FIG. 29, the blank of tray 201 can be viewed. Tray 201 comprises a back panel 15 and side panels 7 and 9, bottom end panel 13 and top end panel 11. Bottom end panel 13 is hinged to back panel 15 at the back panel 15's bottom end edge by score 209. Similarly, side panels 7 and 9 and top end panel 11 are hinged to back panel 15 by scores 205, 207 and 211, respectively.

A stay flap 23 is formed in bottom end panel 13 by substantially parallel slits 215 and 217 extending perpendicularly from score 209 into bottom end panel 13, and slit 219, substantially perpendicular to and extending between slits 215 and 217. As with prior embodiments easle support 19 is formed between two substantially parallel slits 31 and 33 extending from stay flap 23 into back panel 15.

Easle support 19 incorporated in tray 201 includes a modification not previously discussed. This modification is necessitated when the depth of tray 201 (height of bottom end edge 13) is relatively small compared either to the weight of product that tray 201 contains or the angle to the vertical at which tray 201 is to be displayed. Under these circumstances, stay flap 23 is not large enough to properly support tray 201. Therefore, to displace the supportive easle a further distance from the bottom end edge (score 209) of back panel 15, stay panel 27 of easle support 19 is enlarged over that permitted if it was to be defined by a score 35 in stay flap 23 and another score substantially co-linear with bottom end edge of back panel 15 as in the previously described versions above. In easle support 19 of cover 201 stay panel 27 is hinged to stay flap 23 by score 35 and is separated from support panel 29 by score 37. However, stay panel 27 also incorporates score 213 substantially co-linear with score 209. Thus, the depth of stay panel 27, i.e., the distance between scores 35 and 37, is greater than the depth of bottom end panel 13. Yet, because of score 213, stay panel 27 can assume a substantially co-planar position with back panel 15 and bottom end panel 13 when it is in its undeployed position.

The remainder of tray 209 is of conventional design as illustrated in FIGS. 26 through 29. From these figures and the description above one skilled in the art will quickly understand the construction of tray 201 and its cover 203.

OPERATION OF FIGS. 26 THROUGH 29

Referring to FIG. 25, tray 201 and cover 203 are shown in the undeployed state. Stay panel 27 is folded in a co-planar relationship with both bottom end panel 13 and back panel 15 along score 213. In this position tray 201 assumes the same configuration as the conventional tray presently used in the art.

However, tray 201 according to the present invention also possesses the capability of a display tray. This is clearly shown in FIGS. 27 and 28. In accordance with previous description easle support 19 is formed by support panel 29 and stay panel 27 separated by score 37. When easle support 19 is deployed, score 213, which was necessary to permit a portion of stay flap 27 to assume the co-planar position with bottom end panel 13, can be best seen in FIG. 27.

One skilled in the art will recognize that in displacing score 37 from a position substantially co-linear with score 209 to a position more into back panel 15, a larger stay panel 27 is formed. Thus, score 37 is further displaced from the bottom end edge of back panel 13 of tray 201, and thus easle support 19 provides better support for tray 201 in its deployed position.

While the invention has been described by specific embodiments and illustrated variations, it is not limited thereto. Obvious modifications will occur to those skilled in the art. For example, depending on the weight of the contents of the container or card to be displayed by the easle support of the present invention, the angle at which the easle displays the device can be varied. That is, if the article displayed by the container has a relatively large weight with respect to the strength of the paper used to construct the easle support, the angle at which the easel displays the container should be increased to approach the perpendicular.

Another variation that will occur immediately to those skilled in the art is the method by which the various scores above described are created. That is, in order to ease folding along various score lines, such score lines may be partially slit, either along their entire length where the slit does not penetrate through the depth of the paper, or only along part of the length where the slit penetrates through the depth of the paper. *Other embodiments of the present invention can also be found in a co-pending application of the present inventor Ser. No. 135,539, filed March 31, 1980.* Thus, one skilled in the art can create various modifications without departing from the scope of this invention, as defined by the following claims.

What is claimed is:

1. A collapsible easel support means for supporting a display on a surface at an angle comprising:

a back panel having a bottom edge;

a stay flap hinged to said back panel along said bottom edge to rest on said surface;

two slits extending across said bottom edge from the interior of said stay flap to the interior of said back panel;

a first score in said stay flap extending between said two slits;

a second score in said back panel extending between said two slits;

a third score between said first and second scores extending between said two slits;

said first and third scores defining a stay panel and said second and third scores defining a support panel;

said stay panel folded into co-planar contact with said stay flap when said stay flap makes a predetermined angle of less than 90° with said back panel, whereby said support panel between said back panel and said stay flap supports said back panel at said predetermined angle to said surface when said stay flap rests on said surface.

2. A collapsible easel support as in claim 1 including bias means for biasing said second score towards said third score for locking said easel support in the deployed position.

3. A collapsible easel support means as in claim 2 wherein said bias means is a continuous elastic cord.

4. A collapsible easel support means as in claim 3 wherein said continuous elastic cord encircles said second and third scores.

5. A display container having a collapsible easel support for supporting said container at a predetermined angle to a surface comprising:

a front panel having two side edges, a top end edge and bottom end edge;

a first side panel having two side edges and two end edges, one of said side edges hinged to one of the side edges of said front panel;

a second side panel having two side edges and two end edges, one of said side edges hinged to the remaining side edge of said front panel;

a back panel having two side edges; a bottom end edge and a top end edge, one of said side edges hinged to the remaining side edge of said second side panel and the other of said side edges adaptable to permanently abut the remaining side edge of said first side panel;

a stay flap hinged to the bottom end edge of said back panel;

two substantially parallel slits substantially perpendicularly to said bottom end edge extending to either side of said bottom end edge into the interior of said stay flap and the interior of said back panel;

a first score in said back panel substantially parallel to said bottom end edge extending between said two slits;

a second score in said stay flap substantially parallel to the bottom end edge of said back panel extending between said two parallel slits;

a third score between said first and second scores in said back panel substantially parallel to the bottom end edge of said back panel extending between said two parallel slits, said first and third scores defining a support panel and said second and third scores defining a stay panel;

said stay panel folded into co-planar contact with said stay flap when said stay flap makes a predetermined angle of less than 90° with said back panel, whereby said support panel between said back panel and said stay flap supports said container at said predetermined angle to said surface when said stay flap rests on said surface.

6. A display container as in claim 5 wherein:

said top end edge of said second side panel intersects said side edge of said back panel below the top end edge of back panel:

said top end edge of said front panel intersects the top end of said second side panel; and including:

a notch in said front panel extending from said top end edge; and a print flap hinged to the side edge of said back panel above the intersection of said top end edge of said second side panel to fold against the obverse side of said back panel.

7. A display container as in claim 6 including:

a glue flap hinged to the side edge of said first side panel that abuts the side edge of said back panel and engages the obverse face of said back panel; and said print flap having an extension whose obverse side engages at least a portion of said glue flap to sandwich said glue flap between the obverse face of said back panel and said extension.

8. A display container as in claim 5 wherein said end edges of said side panels intersect the side edges of said front and back panels at said predetermined angle.

9. A collapsible easel support as in claim 1 including:

a slit in said third score; and a tongue hinged to said stay flap along a fourth score and adapted for entering said slit and locking said easel support in the operative position.

10. A display card having a collapsible easel support for supporting said display card on a surface at a predetermined angle comprising:

a front panel having two side edges, a top end edge and a bottom end edge;

a back panel having two side edges, a top end edge and a bottom end edge, said top end edge hinged to the top end edge of said front panel;

a stay flap hinged to the bottom end edge of said back panel;

two substantially parallel slits substantially perpendicular and extending to either side of the bottom end edge of said back panel into the interior of said stay flap and said back panel;

a first score in said back panel substantially parallel to said bottom end edge and extending between said two slits;

a second score in said stay flap substantially parallel to the bottom end edge of said back panel and extending between said two parallel slits;

a third score between said first and second scores, and substantially parallel to the bottom end edge of said back panel and extending between said two parallel slits, said second and third scores defining a stay panel and said first and third scores defining a support panel for supporting said display card at said predetermined angle to the surface.

11. A display card as in claim 10 including a pocket flap in said front panel hinged at its upper edge to said front panel and having engagement means to engage said bias means to bias said pocket flap toward said support panel.

12. A display card as in claim 11 wherein said pocket flap has two side edges, and said engagement means are outwardly extending tabs on said side edges of said pocket flap.

13. A display container having a collapsible easle support for supporting said container at a predetermined angle to a surface comprising:

a back panel having a bottom end edge;

a bottom end panel having one edge hinged to the bottom end edge of said back panel;

first and second substantially parallel slits extending from said bottom end edge into said bottom end panel, and a third slit in said bottom end panel substantially perpendicular and extending between said two parallel slits, said first, second and third slits forming a stay flap hinged to said bottom end edge of said back panel; fourth and fifth substantially parallel slits substantially perpendicular to said bottom end edge extending to either side of said bottom end edge into the interior of said stay flap and the interior of said back panel;

a first score in said back panel substantially parallel to said bottom end edge extending between said fourth and fifth slits;

a second score in said stay flap substantially parallel to the bottom end edge of said back panel extending between said fourth and fifth parallel slits;

a third score in said back panel between and substantially parallel to said first and second scores and extending between said fourth and fifth parallel slits, said first and third scores defining a support panel and said second and third scores define a stay panel for supporting said container at said predetermined angle to the surface.

14. A display container as in claim 13 including a fourth score between said second and third scores substantially co-linear with said bottom end edge for permitting a portion of said stay panel between said fourth score and said second score to fold co-planar with said bottom end panel and the remaining portion of said stay panel between said fourth score and said third score to fold co-planar with said back panel.

15. A collapsible easel support for supporting a display on a surface at an angle comprising:

a back panel having a bottom edge;

a stay flap hinged to said back panel along said bottom edge and having first and second sides, said second side resting on said surface;

two slits extending across said bottom edge from the interior of said stay flap to the interior of said back panel to form a strut, said strut comprising:

a stay panel hinged to said stay flap along a first score and resting in co-planer contact with said first side of said stay flap; and a support panel hinged to said back panel along a second score and to said stay panel along a third score supporting said back panel at an angle to said surface.

*16. A display device having a collapsible easel support for supporting a display device on a surface at a predetermined angle comprising:*

*a back panel having a bottom edge;*

*a stay flap;*

*a support panel having top and bottom edges;*

*a stay panel having top and bottom edges;*

*a first hinge hinging said stay flap to said bottom edge of said back panel;*

*a second hinge hinging the bottom edge of said support panel to the top edge of said stay panel;*

*a third hinge hinging the top edge of said support panel to the interior of said back panel;*

*a fourth hinge hinging the bottom edge of said stay panel to said stap flap.*

*17. A display device as in claim 16 wherein said fourth hinge is on the interior of said stay flap.*

*18. A self-supporting display device to rest upon a solid surface, including:*

*a rear panel; a base panel; a hinge dividing said rear and base panel;*

*parallel slits extending from intermediate said rear panel to intermediate said base panel forming an extensible support member;*

*a first score line extending between approximately the top of said slits;*

*a second score line extending between said parallel slits substantially centrally of said hinge;*

*a third score line extending between approximately the bottom of said slits, whereby when said base panel is moved in an arcuate direction the extendable support member will move outwardly to provide a base and a diagonally disposed support offset from each other along said second score line.*

* * * * *